(12) United States Patent
Terentiev

(10) Patent No.: US 11,047,670 B1
(45) Date of Patent: Jun. 29, 2021

(54) INTEGRATED SPACING SENSOR FOR JOINED PARTS AND RELATED METHODS

(71) Applicant: Alexandre N. Terentiev, Santa Rosa, CA (US)

(72) Inventor: Alexandre N. Terentiev, Santa Rosa, CA (US)

(*) Notice: Subject to any disclaimer, the term of this patent is extended or adjusted under 35 U.S.C. 154(b) by 0 days.

(21) Appl. No.: 16/950,091

(22) Filed: Nov. 17, 2020

Related U.S. Application Data

(60) Provisional application No. 63/069,910, filed on Aug. 25, 2020.

(51) Int. Cl.
*G01B 7/24* (2006.01)
*G08B 21/18* (2006.01)
*G01D 5/20* (2006.01)

(52) U.S. Cl.
CPC ............. *G01B 7/24* (2013.01); *G01D 5/2046* (2013.01); *G08B 21/182* (2013.01)

(58) Field of Classification Search
CPC ....... G01B 7/24; G01D 5/2046; G08B 21/182
USPC ........................................ 324/207.11–207.26
See application file for complete search history.

(56) References Cited

U.S. PATENT DOCUMENTS

| 3,056,443 | A | * | 10/1962 | Knocke ................. F16B 39/284 411/186 |
| 4,906,917 | A | | 3/1990 | Olness et al. |
| 5,257,207 | A | * | 10/1993 | Warren ................... B25B 29/02 702/43 |
| 5,423,222 | A | | 6/1995 | Rudd et al. |
| 6,945,098 | B2 | * | 9/2005 | Olson .................. G01N 27/205 324/700 |
| 7,009,409 | B2 | * | 3/2006 | Davie .................... F16J 15/061 324/658 |
| 7,180,227 | B2 | | 2/2007 | Tseng et al. |
| 7,390,580 | B1 | | 6/2008 | Dupont |
| 8,264,347 | B2 | | 9/2012 | Castleman |
| 8,943,884 | B2 | | 2/2015 | Kumar |
| 9,044,535 | B2 | | 6/2015 | Garzaniti et al. |

(Continued)

FOREIGN PATENT DOCUMENTS

| JP | 2000235022 | 8/2000 |
| WO | WO2017039941 | 11/2015 |

OTHER PUBLICATIONS

Craig A. Grimes, et al., Wireless Magnetoelastic Resonance Sensors: A Critical Review; Sensors; 2002.
(Continued)

*Primary Examiner* — Melissa J Koval
*Assistant Examiner* — Rahul Maini
(74) *Attorney, Agent, or Firm* — King & Schickli, PLLC

(57) ABSTRACT

A system and apparatus are provided for use in determining a spacing of a gap between a first flange and a second flange connected by at least one bolt using an integrated sensor. The sensor may include a plurality of electric coils for generating an AC magnetic field for causing a magnetic material to produce a dynamic mechanical response as a result of a change in the spacing of the first and second flanges. A holder for the sensor may be provided, and may be adapted for positioning between the joined parts or the associated flanges, and further may be adapted to attach to a bolt connecting the parts. Related methods include estimating a retained load on a gasket or seal associated with the first and second flanges.

25 Claims, 11 Drawing Sheets

(56) References Cited

U.S. PATENT DOCUMENTS

| | | | |
|---|---|---|---|
| 9,482,587 B2* | 11/2016 | Masuda | G01L 1/12 |
| 10,753,840 B2 | 8/2020 | Terentiev | |
| 2004/0122092 A1 | 6/2004 | Hopmann et al. | |
| 2004/0173978 A1* | 9/2004 | Bowen | F16L 23/22 |
| | | | 277/650 |
| 2007/0108662 A1 | 5/2007 | Jenko | |
| 2009/0199659 A1 | 8/2009 | Abe et al. | |
| 2014/0049008 A1 | 2/2014 | Ziegler | |
| 2015/0337599 A1 | 11/2015 | Bullock | |
| 2016/0341843 A1 | 11/2016 | Hull et al. | |
| 2018/0058993 A1* | 3/2018 | Terentiev | G01R 33/02 |
| 2020/0225109 A1 | 7/2020 | Terentiev | |

OTHER PUBLICATIONS

B.G. Thomas, et al., Implementation of Temperature and Strain Micro-Sensors Into a Casting Mold Surface; Mar. 3, 2011.

G.A. Pacher, et al. In-mold Sensor Concept to Calculate Process-specific Rheological Properties; AIP Conference Proceedings; May 2014.

Manjusha Ramakrishnan, et al.; Overview of Fiber Optic Sensor Technologies for Strain/Temperature Sensing Applications in Composite Materials; Jan. 15, 2016.

Freudenberg Sealing Technologies GmbH & Co. KG; Seal, Feel, Act; Apr. 25, 2016; Weinheim, Germany.

\* cited by examiner

INTEGRATED SPACING SENSOR FOR JOINED PARTS AND RELATED METHODS

This application claims the benefit of U.S. Provisional Patent Application Ser. No. 63/069,910, filed Aug. 25, 2020, the disclosure of which is incorporated herein by reference.

This invention was made with government support under contract number 80NSSC19C0118 awarded by the National Aeronautics and Space Agency. The government has certain rights in the invention.

TECHNICAL FIELD

This document relates generally to the sensing arts and, more particularly, to an integrated gap sensor for sensing a spacing between joined parts and related methods.

BACKGROUND

Using a sensor to determine the status of a seal or gasket is known. Past proposals involve the use of wires to communicate signals to and from the seal in situ. This is undesirable in many applications because it potentially impacts the quality of the seal formed. Wires may also disconnect or become loose from the seal, especially when used in rigorous conditions, and thus may require frequent (and costly) inspection. Maintaining the quality of the seal despite the provision of the sensor is therefore an important consideration.

Known proposals for seal sensors are also highly dependent on temperature. Such sensors thus may not provide an accurate indication of the seal status if the temperature is highly variable, which is the case in most industrial seal applications and, particularly, those in outdoor environments, since the temperature variability cannot be readily predicted or controlled.

Others have proposed the use of so-called "smart" bolts to assess changes in the direct force applied to the joint. These bolts are expensive. Furthermore, in this and the other proposals noted, retrofitting onto existing joints is not possible without disassembling the parts forming the joint, which is costly and undesirable.

Accordingly, a need is identified for a system that can be used as a sensor for assessing the status or condition of joined flanges, such as those associated with a gasket or seal, and possibly other applications involving joined parts, that avoids the above-identified problems and perhaps others that have yet to be discovered.

SUMMARY

The present disclosure proposes an apparatus or system, and related method, that can be used as a sensor for assessing the status or condition of joined flanges, and particularly those associated with a gasket or seal, and possibly other applications involving joined parts. The sensing may be achieved by assessing a change in a gap or spacing between the joined flanges to determine the status or condition, such that it can be determined whether corrective action is required (e.g., seal or gasket replacement, bolt-tightening or adjustment, or possibly just personal inspection of the situation to make a further assessment as to the need for attention).

According to one aspect of the disclosure, an apparatus for sensing a condition of a joint is provided. The joint includes a first flange, a second flange, at least one bolt connecting the first flange to the second flange, and a gasket located between the first flange and the second flange. The apparatus further comprises a sensor integrated into the first flange, the second flange, or the bolt, the sensor adapted to determine or sense a change in a spacing of a gap between the first flange and the second flange.

In one embodiment, the sensor comprises a first component in contact with the first flange and a second component in contact with the second flange. In this or another embodiment, the sensor is connected to the first flange, the second flange, or the at least one bolt. The sensor may be at least partially between the first flange and the second flange.

In these or other embodiments, the sensor comprises a holder positioned at least partially between the first flange and the second flange. The holder may include a magnet form a magnetic coupling with the first flange, the second flange, or the at least one bolt. The holder may further include a seat for seating a first component of the sensor, which seat may be connected to the holder by a connector. The seat may include a spacer for positioning the first component adjacent to the first flange or the second flange.

In these or other embodiments, the sensor comprises a flexible substrate forming a cantilevered oscillator including a plurality of spacers adapted to induce a curvature in the flexible substrate as a result of compression created by the joined parts, wherein the curvature results in a change in a resonance frequency of the cantilevered oscillator. The sensor may further comprise an interrogator for measuring a resonance frequency of a magnetic material supported in a cantilevered fashion from a periphery of the first flange or the second flange and forming the cantilevered oscillator. The interrogator may comprise at least one electric coil for generating an AC magnetic field to excite an oscillating motion of the magnetic material and detect a signal representing an amplitude and frequency thereof.

In one possible embodiment, a plurality of sensors are integrated into the first flange, second flange, or each of a plurality of bolts. The plurality of sensors are adapted to determine a change in the spacing of the gap at a plurality of locations. Based on the changes at multiple locations, a variability of the gap across the first flange and second flange may be determined.

A further aspect of the disclosure pertains to an apparatus for sensing a condition of a joint formed by a first flange and a second flange having a gap therebetween, at least one bolt connecting the first flange to the second flange, and a gasket located between the first flange and the second flange. The apparatus comprises a sensor adapted to be integrated into the first flange, the second flange, or the at least one bolt. The sensor is adapted to determine a change in a spacing of the gap.

In one embodiment, the sensor comprises a first component adapted to contact the first flange and a second component adapted to contact the second flange. The sensor may be adapted to connect to the first flange, the second flange, or the at least one bolt. In one possible version, the sensor is adapted to attach to the at least one bolt, such as by receiving it.

In these or other embodiments, the sensor is adapted to fit in the gap between the first flange and the second flange. A holder may also be provided for positioning at least partially between the first flange and the second flange. The holder may include a magnet for forming a magnetic coupling with the first flange, the second flange, or the at least one bolt. The holder may include a seat for a sensor component, the seat optionally being connected to the holder by a connector. The holder may also include a spacer for positioning a sensor component adjacent to the first flange or the second flange.

In these or other embodiments, the sensor comprises a flexible substrate forming a cantilevered oscillator including a plurality of spacers adapted to induce a curvature in the flexible substrate as a result of compression created by the joined parts, wherein the curvature results in a change in a resonance frequency of the cantilevered oscillator. The sensor may comprise an interrogator for measuring a resonance frequency of a magnetic material supported in a cantilevered fashion from a periphery of the first flange or the second flange and forming the cantilevered oscillator. The interrogator comprises at least one electric coil for generating an AC magnetic field to excite an oscillating motion of the magnetic material and detect a signal representing an amplitude and frequency thereof.

This disclosure also pertains to a method for assessing a condition of a joint between a first flange and a second flange. The method comprises determining a change in a spacing of a gap between the first flange and second flange using a sensor integrated into the first flange or the second flange. The method may further comprise sending an alert when the change in the gap varies from a predetermined value, as well as assessing the change in the spacing at various locations to determine variability.

Furthermore, the disclosure pertains to a method of determining a condition of a gasket between a first flange and a second flange connected by at least one bolt. The method comprises measuring a change in a spacing of a gap between the first flange and second flange using a sensor integrated into the first or second flange. Based on the change in the spacing, the method is used for estimating the retained load on the gasket.

In one embodiment, the estimating step comprises using a ratio of a change in the gap from an initial bolt elongation value as an estimate of the retained load. The method may further include the step of sending an alert when the estimate of the retained load is below a predetermined value.

BRIEF DESCRIPTION OF THE DRAWING FIGURES

The above and further advantages of the concepts discussed in the present disclosure may be better understood by referring to the following description in conjunction with the accompanying drawings in which.

Figure 1:
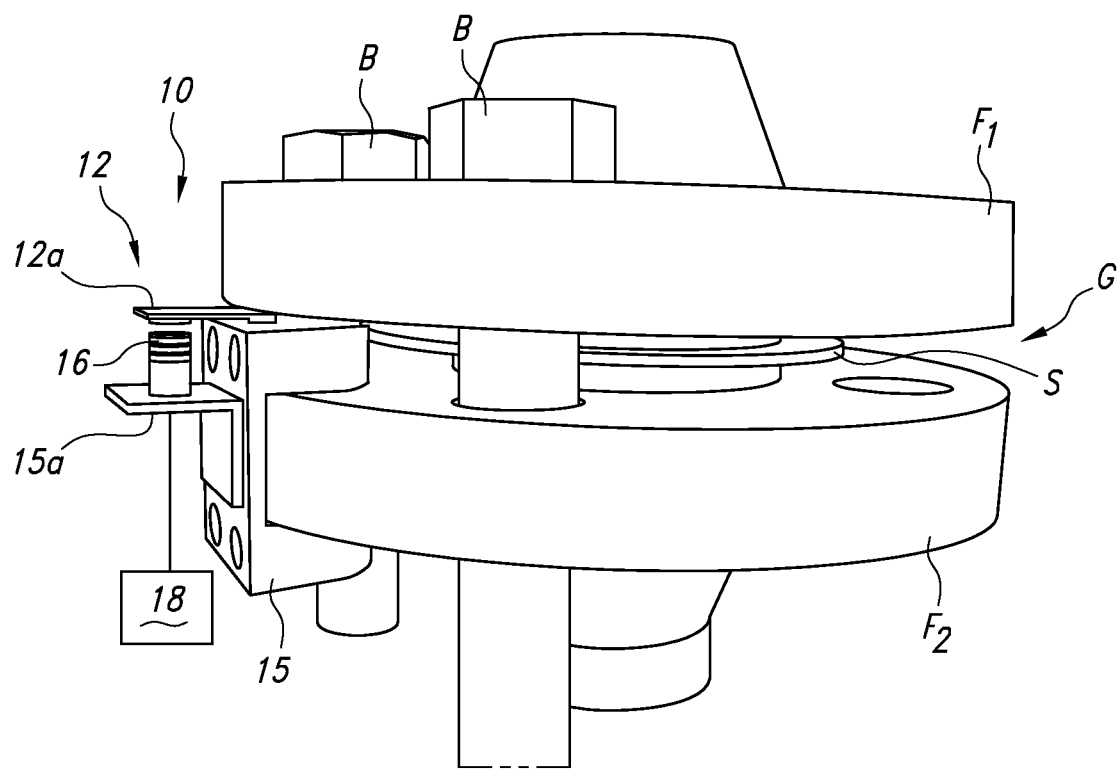
FIG. 1 is a partially cutaway, perspective view of first and second joined parts including an integrated gap sensor according to the disclosure.
Figure 2:
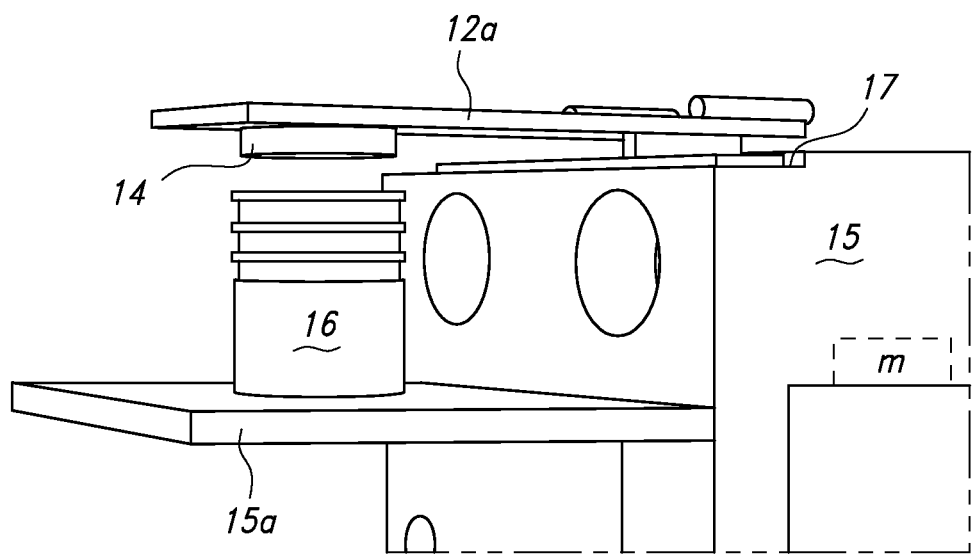
FIG. 2 is a close up view of a part of the integrated sensor of FIG. 1.
Figure 3:
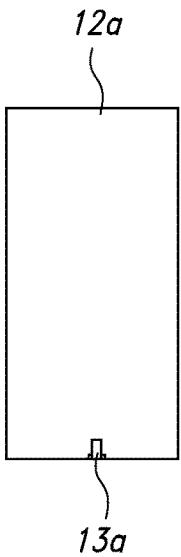
FIGS. 3 and 4 are top and bottom views of a sensor substrate.
Figure 4:
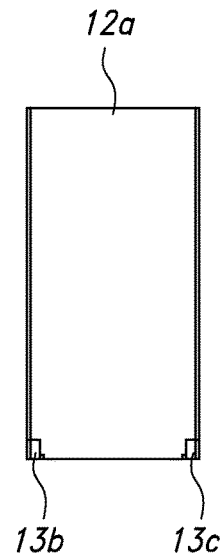

The dimensions of some of the elements may be exaggerated relative to other elements for clarity or several physical components may be included in one functional block or element. Further, sometimes reference numerals may be repeated among the drawings to indicate corresponding or analogous elements. Moreover, some of the blocks depicted in the drawings may be combined into a single function.

DETAILED DESCRIPTION

This disclosure pertains generally to a sensor system 10 for determining a spacing or gap between parts joined together so as to form a joint. As outlined further in the description that follows, this gap or spacing (or, in particular, a change from an initial value) may be indicative of the condition of the arrangement, including possibly the condition (such as a viscoelastic property) of a seal or gasket provided between the joined parts. The gap or spacing measurement may also be utilized to assess the retained load after initial tightening or torqueing of the fasteners connecting the joined parts.

Turning first to FIG. 1, the sensor system 10 in a first embodiment is adapted to connect with joined parts including opposed, adjacent flanges $F_1$, $F_2$. The parts, or in particular the flanges $F_1$, $F_2$ may be connected by fasteners, such as peripherally arranged, elongated bolts B, which are omitted in some embodiments for purposes of clarity. The flanges $F_1$, $F_2$ may compress a gasket or seal S therebetween, and located radially inward of the fasteners (bolts B) in this embodiment.

The sensor system 10 includes an integrated sensor 12 for sensing a spacing or gap between the joined parts (with the term "integrated" connoting formed into a whole with or introduced into the resulting joint formed by joined parts and their associated flanges, possibly with a gasket or seal, as contrasted with a manual or mobile sensor that may be carried or transported by a user independent of the joined parts). In one exemplary embodiment, this gap sensor 12 comprises a substrate 12a supporting or carrying a magnetic material, such as for example a permanent magnet 14. The substrate 12a is connected to a support in the form of a holder 15, which is adapted to fit within and position the substrate at least partially in a gap G between the adjacent, spaced apart flanges $F_1$, $F_2$. The connection may be by way of a seat 17 integral with the holder 15, but as outlined further below, the seat may also be a separate component connected to the holder.

Although not required, as will be understood from reviewing the description that follows, the holder 15 in the illustrated embodiment may be adapted to receive and be carried by one of the parts, such as by attachment to one of the flanges $F_1$, $F_2$. This may be achieved, for example, by providing the holder 15 with a suitably recessed portion for partially accommodating the part. This typically will be in the nature of a curved peripheral or rim portion of a flange, as illustrated, but may be of any shape or size without limitation.

With reference to FIGS. 2-6, the substrate 12a may comprise a flat piece of flexible material, such as for instance spring steel. A plurality of spacers 13 are arranged to induce a transverse curvature in the substrate 12a when compressed between the joined parts, such as flanges $F_1$, $F_2$ (compare substrate 12a and substrate 12a' in FIGS. 5 and 6). For example, a first spacer 13a may be provided on a first side at one end of the substrate 12a at a generally centered location, and a plurality (e.g., pair) of spacers 13b, 13c may be provided at the same end of the substrate at spaced locations on either side of the centered spacer 13a. The spacers 13a, 13b, 13c may each comprise generally cylindrical, elongated pieces of rigid metal material, and may be bonded directly to the substrate 12a, such as by welding (e.g., using a laser).

Figure 5:
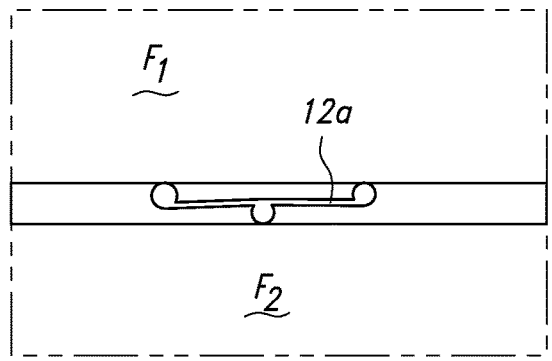
FIGS. 5 and 6 are side views showing deformation of the sensor substrate as a result of compression of flanges of the first and second joined parts.
Figure 6:
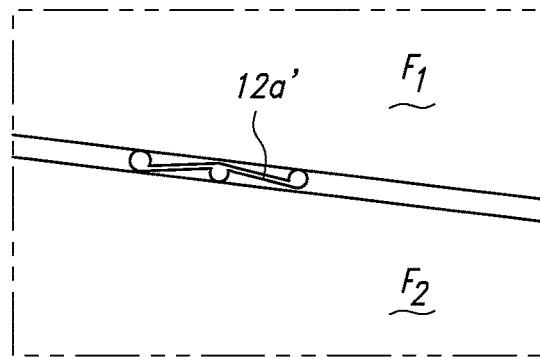
Figure 7:
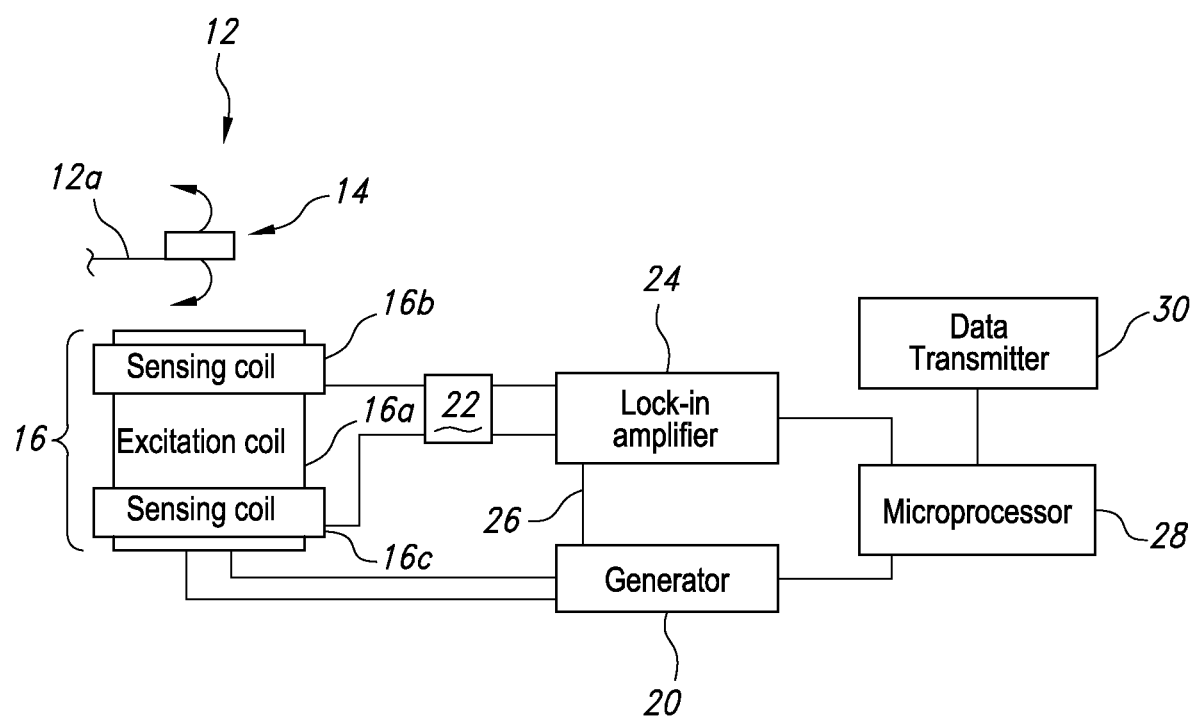
FIG. 7 is a schematic view of the sensor system.

As can be understood by comparing FIGS. 5 and 6, the compression created when the joined parts, such as flanges $F_1$, $F_2$, are drawn together by the fasteners (bolts B) induces a transverse curvature in the partially sandwiched substrate 12a. Using an externally applied, variable magnetic field, which may be provided by an interrogator 16 supported by the holder 15 in opposition to the magnet 14 (such as along a flange 15a connected to the holder 15) in a manner discussed further below, the magnet 14 may be caused to generate a signal representative of a dynamic mechanical response of the substrate 12a created as a result of the induced transverse curvature. The resulting assembly thus forms a harmonic oscillator, which can be excited by an external magnetic, alternating current field, which may be applied by a generator.

In one example, the interrogator 16 may comprise an electric excitation coil 16a associated with the interrogator 16. This electric coil 16a may be connected to a function generator 20 to generate a fixed-frequency steady state signal. The generated signal may then be transmitted to and analyzed by an analyzer 18 to determine changes in the curvature of the substrate 12a over time, and thus an indication of a change in the spacing (that is, the size of the gap G in the illustrated embodiment) between the joined parts (such as flanges $F_1$, $F_2$).

As can be appreciated, this change may be indicative of a spacing between the joined parts, such as that which might result from relaxation of associated fasteners or a change in the viscoelastic property of a gasket or seal S between the joined parts. This change may thus be representative of degradation or over/under compression, either of which could lead to deleterious failure. Depending on the circumstances, the amount of change from a pre-determined level, such as an initial value, a previously measured value, or a variability with the value(s) of other sensor(s) (as outlined further in the following description) may dictate ameliorative action (e.g., seal replacement, bolt tightening, or perhaps just visual inspection to assess conditions).

The interrogator 16 may further comprise two sensing coils 16b, 16c wound in the opposite direction. These coils 16b, 16c form a gradiometer capable of sensing the motion of the magnet 14, but not the excitation field created by excitation coil 16a. Thus, the magnet 14 once mechanically excited by the external field not only forms a harmonic forced oscillator, but also generates a signal in the form of an AC magnetic field, the amplitude of which represents the amplitude of the oscillations of the magnetic material or magnet 14. This AC field may be picked up by the sensing coils 16b, 16c of interrogator 16, producing an AC voltage proportional to the amplitude of magnet spatial oscillations (which voltage may be determined by an associated voltmeter 22).

The frequency of the signal may be gradually increased, maintaining steady state operation, and the response of the magnetic material (e.g., magnet 14) at a desired frequency range. In particular, a mechanical resonance frequency of the magnetic material is determined by finding the frequency where the amplitude is the greatest. This may involve scanning a resulting external variable magnetic field within a frequency range including natural resonance frequencies of the magnetic material, and measuring an amplitude of oscillations of the magnetic material at each frequency as well as phase shift relative to a phase of the external magnetic field. One or more natural resonance frequencies of the magnetic material may be determined by finding frequencies producing oscillatory motion with maximum amplitude or frequencies producing a predetermined phase shift of the magnet oscillations relative to a phase of the external magnetic field.

In terms of signal processing, the detected magnetic response may be sent to a lock-in amplifier 24 to be amplified and measured. A reference line 26 may also be connected between function generator 20 and the lock-in amplifier 24, so the amplifier can precisely measure the signal at the excitation frequency and predetermined phase shift. A microprocessor 28 may be used to control the operation, as well as collect and process data. A transmitter 30 may be used to transmit the sensor data (or an alarm) wirelessly to a remote location, such as a central server, such that appropriate evaluation or action may be taken. For instance, a determined resonance of the magnetic material may be compared with a pre-determined allowed range and, if the resonance is outside of the pre-determined range, it may be determined that the installation is faulty or otherwise not performing as expected for a given condition.

Figure 8:
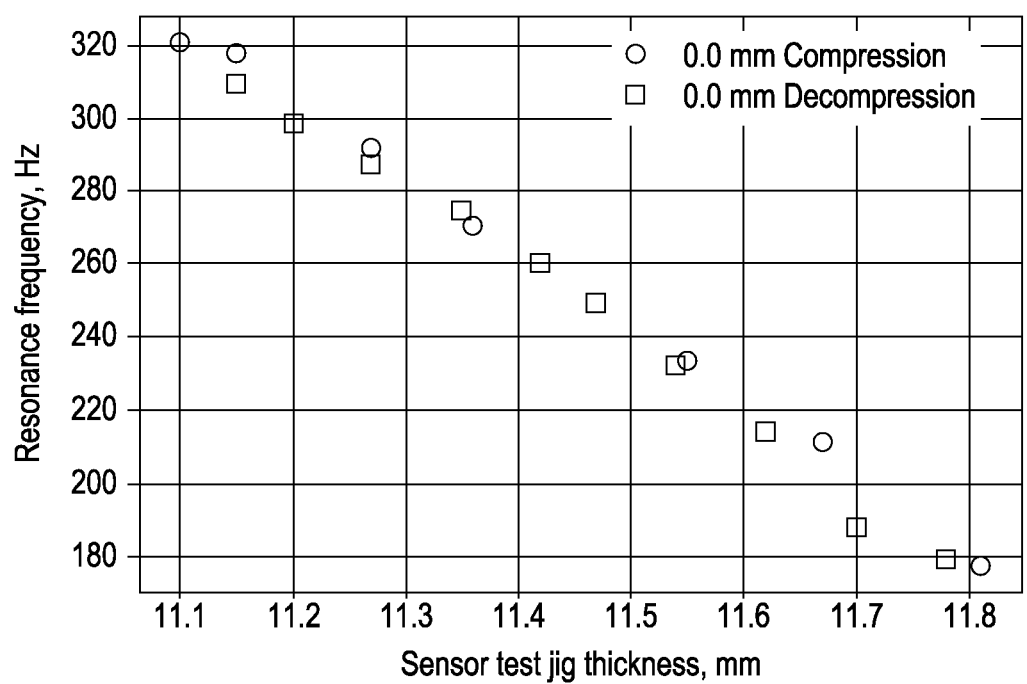
FIG. 8 is a graphic representation of experimental results.

FIG. 8 illustrates an exemplary frequency-thickness calibration curve for a sensor including a gap sensor held in a test jig. The jig with the sensor was initially compressed from an initial thickness of 11.8 mm. Each compression step corresponds to the reduced overall thickness of the jig which accompanies increasing flex sensor curvature. Total thickness reduction of the sensor caused by the change in thickness of the sensor bowing under load, was 0.7 mm. As can be seen, the sensor exhibits a very linear dependence of resonant frequency on sensor thickness, with negligible hysteresis, as confirmed by a reversible recovery after a stress/release cycle. The sensor was made of a substrate fabricated from commercially available spring steel of 0.2-mm thickness and 9.5-mm width. The length of the cantilever was 20 mm.

Figure 9:
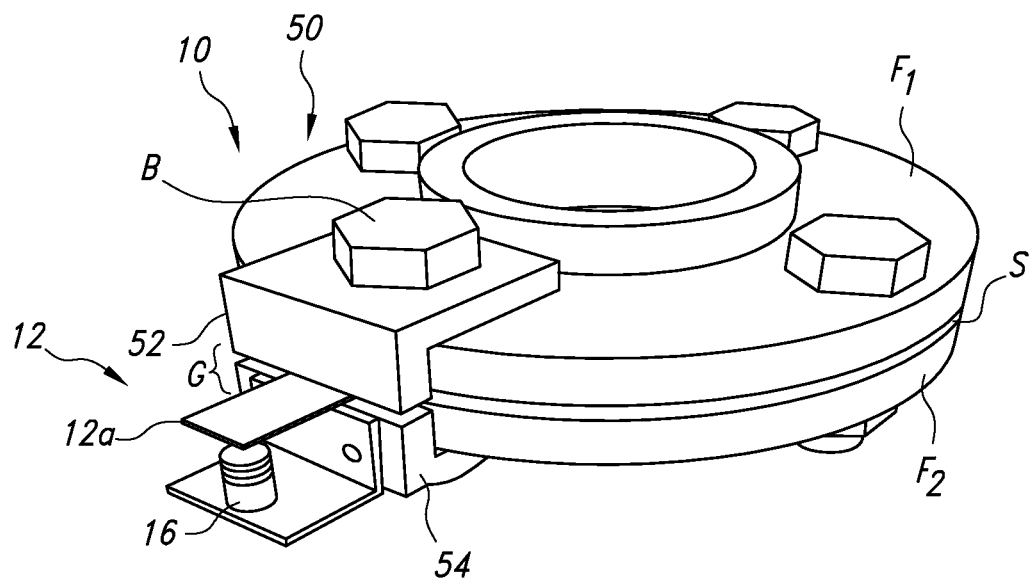
FIG. 9 is an alternative embodiment of the integrated gap sensor.
Figure 10:
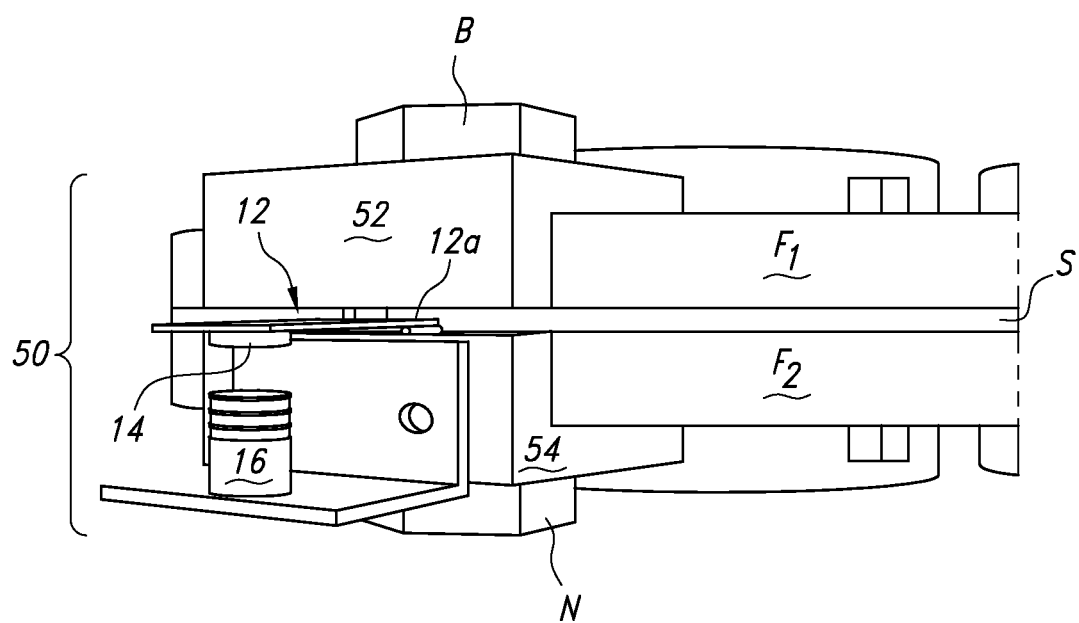
FIG. 10 is an enlarged view of the integrated gap sensor.
Figure 11:
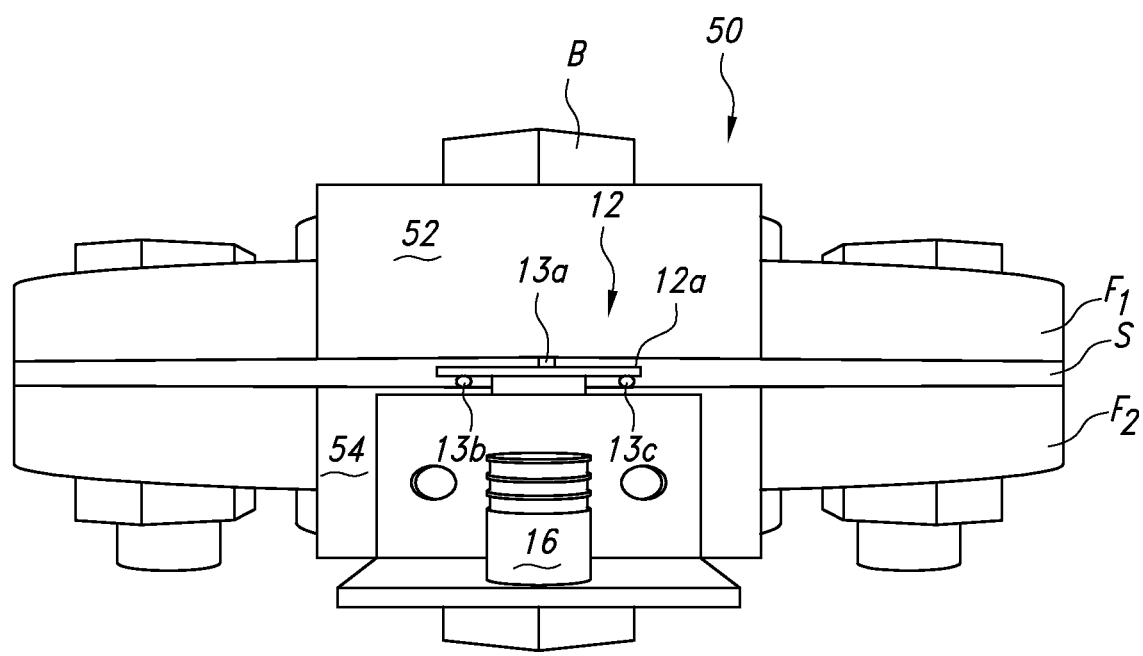
FIG. 11 is an alternative enlarged view of the integrated gap sensor.

Turning now to FIGS. 9-11, an alternative version of the sensor system 10 with a gap sensor 12 is shown, which is adapted for joined parts with contacting faces, where the holder 15 shown above cannot be interposed in the space or gap. In this embodiment, a modified version of a holder 50 for the sensor arrangement is provided. This holder 50 which includes a first mount 52 adapted to connect to the first joined part, such as flange $F_1$, and a second mount 54 adapted to connect to the second joined part, such as flange $F_2$, which together sandwich a gasket or seal S extending to a periphery of the parts.

Optionally, a radially extending portion of each mount 52, 54, may be adapted for receiving one of the bolts B connecting the flanges $F_1$, $F_2$, which may include an associated nut N on the opposite side of the joined parts. Depending portions of the mounts 52, 54 are arranged external to the peripheral region of the joined parts so as to form a gap G, thus providing the mounts with a generally L-shaped cross-section.

The flexible substrate 12a including a first sensor component, such as permanent magnet 14, is attached to one of the mounts, such as the first mount 52 in the illustrated figure, so as to form the sensor 12. The second mount 54 supports the second component of the sensor (interrogator 16) adjacent, but in opposition to the first component (substrate 12a and magnet 14). The holder 50 thus connects the sensor 12 to the first part, and the interrogator 16 to the second part.

As with the first embodiment, the flexible substrate 12a includes the spacers 13a, 13b, 13c, as described above. Consequently, the substrate 12a is caused to bend or curve in a transverse direction when the mounts 52, 54 are compressed as a result of joining of the associated parts or flanges $F_1$, $F_2$. The arrangement may thus function essentially as described previously, but without any portion of the sensor 12 being physically positioned between the joined parts. Yet, the ability of the system 10 to sense the condition of the substrate 12a as a result of the joint spacing (represented by the position of mounts 52, 54) remains.

Figure 12:
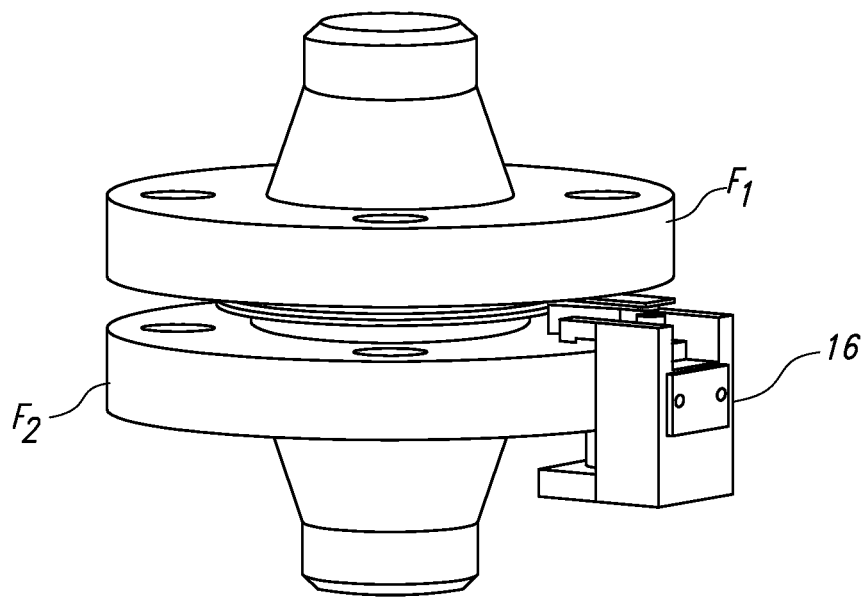
FIG. 12 is a perspective view of a holder for an integrated sensor.
Figure 13:
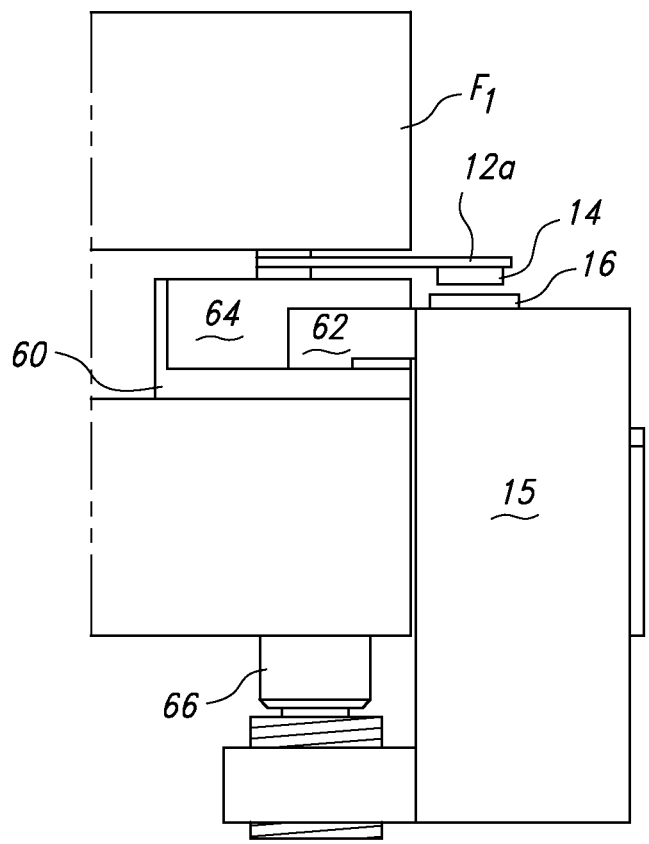
FIG. 13 is a cutaway view of the holder mounted to a flange.

An alternative embodiment of the holder 15 is shown in FIGS. 12 and 13. In this embodiment, the holder 15 is adapted to connect to one of the flanges $F_1$, $F_2$ (shown as raised face flanges) as per the FIG. 1 example. In this version, the substrate 12a supporting the sensor 12 (including permanent magnet 14 adjacent to the interrogator 16) is separated from the holder 15 by a seat 60, which is separate from the holder and connected by a connector 62. The seat 60 includes a spacer 64 for positioning the substrate 12a in contact with the opposite (upper) flange ($F_1$ in FIG. 1, for example). This mechanical separation of the holder 15 from the seat 60 and the ability of the latter to move independently ensures that only vertical clamping force is produced. The holder 15 may include an adjustable fastener, such as a screw 66, for attaching to the opposite flange ($F_2$ in FIG. 13), but could also include a magnet to form a magnetic coupling, as noted further in the following discussion. The arrangement of sensor 12 may otherwise operate as previously described.

The ability to assess or sense a change in the gap or spacing between joined parts may also be used to determine a retained load maintained by the fasteners or bolts joining the parts after initial torqueing. Specifically, the load is maintained by the bolts that are elongated during torqueing process and provide a spring load. Relaxation (including of any associated gasket or seal between the flanges $F_1$, $F_2$, if present) leads to reduction in its thickness and consequently, to the overall gap reduction. This gap reduction is equal to the change in the bolt elongation under assumption that flanges are not compressible. Therefore, by knowing initial post-torqueing load, stress strain curve of the fasteners or bolts and by measuring the change in the gap (change in the bolt elongation), the retained load may be calculated. The initial load is typically set by torque wrenches that measure the torque applied to individual bolts of a flange.

The retained load may be estimated using the following equation:

$$R=I(E-dE)/E=I(1-dE/E). \quad (1)$$

Where:
R is retained gasket load,
I is initial load,
E is the initial bolt elongation, and
dE is the measured gap change.

If the estimated retained load based on the change in gap is below a predetermined value (which will depend on the joint arrangement, but may comprise anywhere from 1-99% of the initial bolt elongation depending on the desired level of sensitivity), then an alert may be provided (sent) to a remote location indicating to a person that attention is required (such as via a wired or wireless arrangement, as described previously). From this value or otherwise from the obtained assessment of the estimated retained load, it can be determined whether action to either replace a seal or gasket associated with the joined parts, tighten one or more bolts associated with the joined parts, or inspect the joined parts to determine if other forms of attention are required.

Example

Figure 14:
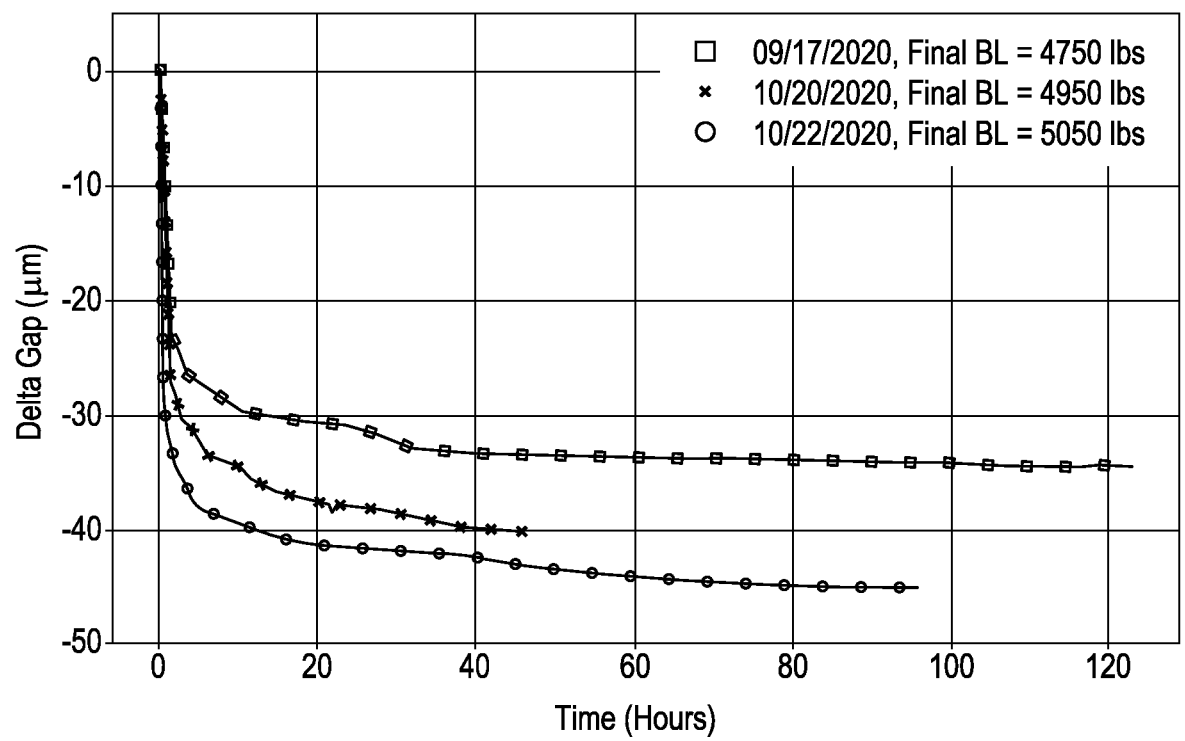
FIG. 14 is a graphic representation of experimental results.

FIG. 14 displays relaxation curves for three different arrangements of joined parts. The initial bolt load was 11,000 lb. The numbers in the top right corner show the final reading on force sensitive bolts closest to the sensor (averaged over two bolts next to the sensor location). The following table shows retained load measured by bolts vs measured by gap reduction and calculated with Equation 1.

| | Retained load measured by bolts, lb | Retained load measured by gap change and calculated with Eq. 1, lb | Difference in values for two methods, % |
|---|---|---|---|
| Gasket-1 (bottom curve in FIG. 14) | 5050 | 5036 | 0.3 |
| Gasket-2 (middle curve) | 4950 | 5700 | 15 |
| Gasket-3 (top curve) | 4750 | 6560 | 38 |

The bottom and middle curves show good consistency for retained load value measured by two methods. The top curve is an outlier, indicating a significant (38%) difference between retained load measured by two methods. A hypothesis is that this outlier resulted from using a different clamp, or a difference in the installation process of the associated gasket. At the same time, good consistency between two methods for the other curves show that obtaining retained load via gap reduction measurement is valid approach that can be used as a substitute for bolt force measurement.

Various modifications are possible without departing from the scope of the disclosed invention. For example, while a permanent magnet 14 is perhaps a desired approach in terms of simplicity and cost, other forms of magnetic or ferromagnetic material may be used, as may a magnetostriction material. Likewise, the interrogator 16 may comprise a Hall probe, a microphone for measuring acoustic energy, a vibration sensor, or any other form of device capable of detecting the oscillations in the magnetic material (e.g., magnet 14). Additional details may be found in Grimes et al., "Wireless Magnetoelastic Resonance Sensors: A Critical Review," Sensors 2002 (ISSN 1424-8220), the disclosure of which is incorporated herein by reference.

Figure 15:
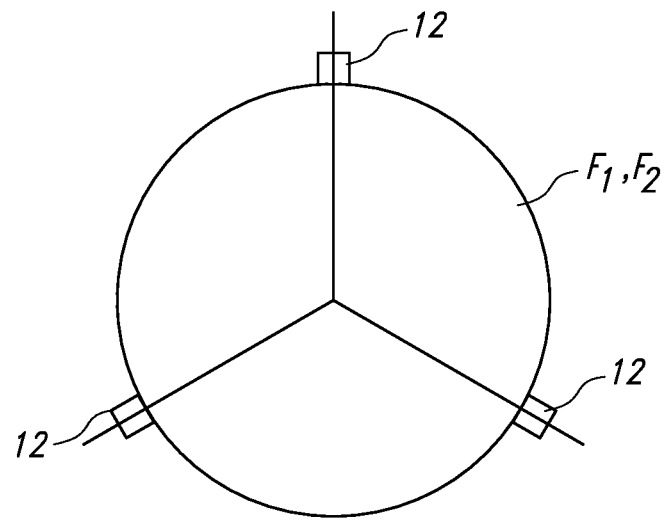
FIGS. 15 and 16 are schematic views of alternative arrangements of gap sensors.
Figure 16:
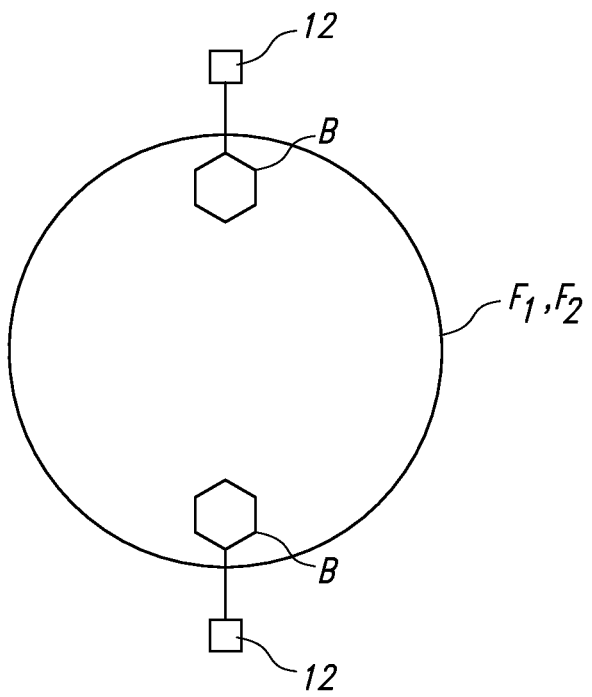

Although only one sensor 12 is shown in certain embodiments, it can be appreciated from that a plurality of sensors may be associated with first and second joined parts. For example, three sensors 12 may be provided for the joined parts, spaced about 120 degrees apart or otherwise (FIG. 15), or possibly one sensor attached to each bolt or fastener used (FIG. 16). These types of arrangements may be used to assess the relative loading on different parts of the gasket or seal to assess variability and take corrective measures, either during initial torqueing or over the passage of time.

Figure 17:
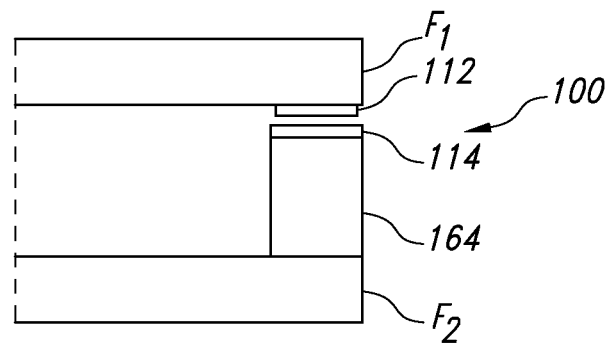
FIG. 17 is a schematic view of an alternate embodiment.

While a particular form of sensor for sensing the gap between joined parts, it can be understood that the sensor may take other known forms, including for example optical, tactile (mechanical), electric, magnetic, sound, or vibrational sensors, so long as they are capable of measuring the space or gap between the joined parts. For example, as shown schematically in FIG. 17, the sensor system 100 may comprise first and second sensor components 112, 114, such as any of the above, for detecting the gap between flanges $F_1$, $F_2$. This figure also shows an optional spacer 164 for supporting at least one of the sensor components 112, 114 in a position so as to reduce the measurement gap and help ensure the accuracy of the results. An associated holder for the sensor component(s) 112, 114 is omitted from this view, but may be any of the above-described forms, as may be the means for processing the sensor to provide an alert in a user-perceptible form. Additional sensors may also be provided in proximity of the joined parts to measure environmental conditions, such as temperature, and thus give an indication of the circumstances of a particular behavior (i.e., rigidity may naturally increase at low temperatures).

Figure 18:
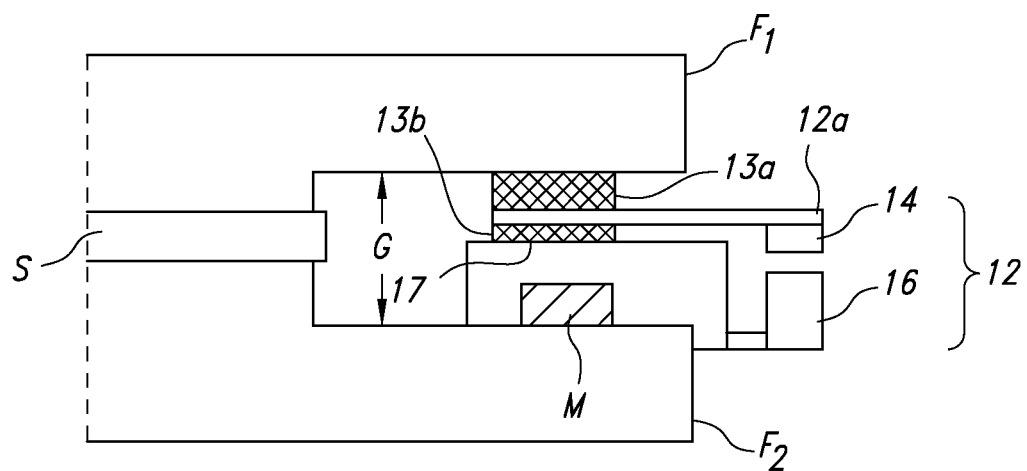
FIGS. 18 and 19 illustrate further alternative embodiments.

As noted above, the holder 15 may also be adapted to connect to either flange $F_1$, $F_2$ sandwiching seal S, or at least one of the bolts B (if magnetic) connecting the flanges. This may be done using an attractive magnet M optionally forming part of the holder (see FIG. 2), which is sized to be at least partially positioned in the gap G. For example, as shown in FIG. 18, a magnet M is used to connect the holder 15 to flange $F_2$, which may be formed on a surface of the holder opposite the seat 17 for seating the substrate 12a (or more particular, the spacers (only one 13b shown arranged opposite spacer 13a) in a cantilevered fashion. The interrogator 16 forming the remaining part of sensor 12 may also be supported by the holder 15 adjacent to the magnet 14.

Figure 19:
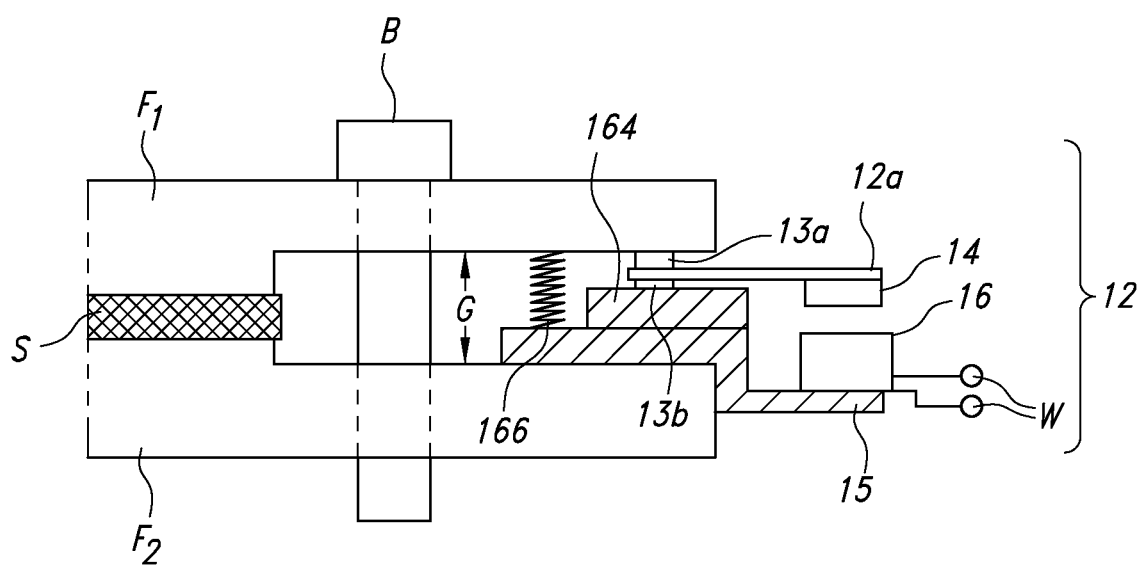

An alternative manner of coupling the holder 15 in position in shown with reference to FIG. 19, which again depicts flanges $F_1$, $F_2$ sandwiching seal S, or at least one of the bolts B (if magnetic) connecting the flanges. The holder 15 is again is sized to be at least partially positioned in the gap G, and a biasing force provided by a compressed spring 166 may be used to connect the holder 15 to flange $F_2$. The spring 166 may be attached to the surface of the holder 15 forming the seat 17 for seating the substrate 12a (or more particularly, the spacer 164, which may support spacer(s) 13a, 13b (third spacer not shown)), and may be manually compressed for insertion into the gap G and expanding to secure the sensor 12 in place between the flanges $F_1$, $F_2$. As in FIG. 18, the interrogator 16 forming the remaining part of sensor 12 may also be supported by the holder 15 adjacent to the magnet 14. The interrogator 16 may be connected to corresponding leads or wires W (which are omitted from the other figures but may be provided to transmit signals(s) to any analyzer for analyzing the condition of the joint).

Summarizing, this disclosure may be considered to relate to the following items:

1. An apparatus for sensing a condition of a joint, comprising:
   a first flange;
   a second flange;
   at least one bolt connecting the first flange to the second flange;
   a gasket located between the first flange and the second flange; and
   a sensor integrated into the first flange, the second flange, or the bolt, the sensor adapted to determine a change in a spacing of a gap between the first flange and the second flange.

2. The apparatus of item 1 wherein the sensor comprises a first component in contact with the first flange and a second component in contact with the second flange.

3. The apparatus of item 1 or item 2, wherein the sensor is adapted to connect or clamp onto the first flange, the second flange, or the at least one bolt.

4. The apparatus of any of items 1-3, wherein the sensor is at least partially between the first flange and the second flange.

5. The apparatus of any of items 1-4, wherein the sensor comprises a holder positioned at least partially between the first flange and the second flange.

6. The apparatus of item 5, wherein the holder includes a magnet form a magnetic coupling with the first flange, the second flange, or the at least one bolt.

7. The apparatus of item 5 or item 6, wherein the holder includes a seat for seating a first component of the sensor.

8. The apparatus of item 7, wherein the seat is connected to the holder by a connector.

9. The apparatus of item 7 or item 8, wherein the seat includes a spacer for positioning the first component adjacent to the first flange or the second flange.

10. The apparatus of any of items 1-9, wherein the sensor comprises a flexible substrate forming a cantilevered oscillator including a plurality of spacers adapted to induce a curvature in the flexible substrate as a result of compression created by the joined parts, wherein the curvature results in a change in a resonance frequency of the cantilevered oscillator.

11. The apparatus of any of items 1-10, wherein the sensor comprises an interrogator for measuring a resonance frequency of a magnetic material supported in a cantilevered fashion from a periphery of the first flange or the second flange and forming the cantilevered oscillator.

12. The apparatus of item 11, wherein the interrogator comprises at least one electric coil for generating an AC magnetic field to excite an oscillating motion of the magnetic material and detect a signal representing an amplitude and frequency thereof.

13. The apparatus of any of items 1-12, further including a plurality of sensors integrated into the first flange, second flange, or a plurality of bolts, the plurality of sensors adapted to determine a change in the spacing of the gap at a plurality of locations, whereby a variability of the gap across the first flange and second flange may be determined.

14. An apparatus for sensing a condition of a joint formed by a first flange and a second flange having a gap therebetween, at least one bolt connecting the first flange to the second flange, and a gasket located between the first flange and the second flange, comprising:
   a sensor adapted to be integrated into the first flange, the second flange, or the at least one bolt, such as by connecting thereto, the sensor adapted to determine a change in a spacing of the gap.

15. The apparatus of item 14, wherein the sensor comprises a first component adapted to contact the first flange and a second component adapted to contact the second flange.

16. The apparatus of item 14 or item 15, wherein the sensor is adapted to connect to the first flange, the second flange, or the at least one bolt.

17. The apparatus of any of items 14-16, wherein the sensor is adapted to attach to the at least one bolt.

18. The apparatus of any of items 14-17, wherein the sensor is adapted to fit in the gap between the first flange and the second flange.

19. The apparatus of any of items 14-18, wherein the sensor comprises a holder adapted for positioning at least partially between the first flange and the second flange.

20. The apparatus of item 19, wherein the holder includes a magnet for forming a magnetic coupling with the first flange, the second flange, or the at least one bolt.

21. The apparatus of item 19 or item 20, wherein the holder includes a seat for a sensor component, the seat being connected to the holder by a connector.

22. The apparatus of any of items 19-21, wherein the holder includes a spacer for positioning a sensor component adjacent to the first flange or the second flange.

23. The apparatus of any of items 14-22, wherein the sensor comprises a flexible substrate forming a cantilevered oscillator including a plurality of spacers adapted to induce a curvature in the flexible substrate as a result of compression created by the joined parts, wherein the curvature results in a change in a resonance frequency of the cantilevered oscillator.

24. The apparatus of any of items 14-23, wherein the sensor comprises an interrogator for measuring a resonance frequency of a magnetic material supported in a cantilevered fashion from a periphery of the first flange or the second flange and forming the cantilevered oscillator.

25. The apparatus of item 24, wherein the interrogator comprises at least one of electric coil for generating an AC magnetic field to excite an oscillating motion of the magnetic material and detect a signal representing an amplitude and frequency thereof.

26. A method for assessing a condition of a joint between a first flange and a second flange, comprising:
determining a change in a spacing of a gap between the first flange and second flange or determining a change in the spacing of the gap at a plurality of locations, whereby a variability of the gap across the first flange and second flange may be determined, using a sensor integrated into the first flange or the second flange.

27. The method of item 26, further comprising sending an alert when the change in the gap varies from a predetermined value.

28. A method of determining a condition of a gasket between a first flange and a second flange connected by at least one bolt, comprising:
measuring a change in a spacing of a gap between the first flange and second flange using a sensor integrated into the first or second flange; and
based on the change in the spacing, estimating the retained load on the gasket.

29. The method of item 28, wherein the estimating step comprises using a ratio of a change in the gap from an initial bolt elongation value as an estimate of the retained load.

30. The method of item 29, further including the step of sending an alert when the estimate of the retained load is below a predetermined value.

30. An apparatus, comprising:
first and second joined parts; and
an integrated sensor adapted for determining a change in a spacing of the first and second joined parts.

31. The apparatus of item 30, wherein the sensor comprises a cantilevered oscillator.

32. The apparatus of item 30 or item 31, including a flexible substrate with plurality of spacers at least partially located in the gap between the first and second joined parts.

33. The apparatus of any of items 30-32, wherein the flexible substrate comprises a magnetic material.

34. A method of determining a change in a spacing between a first flange and a second flange forming a joint, comprising:
associating an integrated gap sensor with the joint; and
using the integrated gap sensor, determining the change in the spacing.

35. The method of item 34, wherein the gap sensor comprises a magnetic material attached to the cantilevered flexible substrate, and the method further includes the step of determining a resonance frequency of the magnetic material or a width of a resonance curve of the magnetic material to determine a change in the spacing.

36. The method of item 34 or item 35, further including the step of positioning the integrated gap sensor at least partially between the first flange and the second flange.

37. A sensor system for sensing a spacing of a first flange and a second flange connected by a bolt, comprising:
a sensor associated with the joined parts, the sensor comprising cantilevered flexible substrate with attached magnetic material; and
an interrogator comprising an electric coil for generating a magnetic field for exciting mechanical oscillations of magnetic material and outputting a signal representative of a dynamic mechanical response of the sensor.

38. The system of item 37, wherein the sensor comprises a flexible substrate including a plurality of spacers adapted to induce a curvature in the flexible substrate as a result of compression of the first flange and the second flange.

39. The system of item 37 or item 38, wherein the magnetic material comprises a permanent magnet.

40. The system of any of items 37-39, further including a holder for holding the sensor, the holder being adapted for positioning at least partially in a gap between the first flange and the second flange.

41. An apparatus, comprising:
first and second joined parts; and
an integrated sensor adapted for determining a change in a spacing of the first and second joined parts, wherein integrated sensor comprises a cantilevered oscillator 42. The apparatus of item 41, wherein the integrated sensor comprises a flexible substrate forming a cantilevered oscillator, including a plurality of spacers adapted to induce a curvature in the flexible substrate as a result of compression created by the joined parts, wherein induced curvature induces change in resonance frequency of the cantilever.

43. The apparatus of item 42, wherein the flexible substrate and plurality of spacers are at least partially located in a gap between the first and second joined parts.

44. The apparatus of item 42, wherein the integrated sensor comprises a magnetic material attached to the flexible substrate, and further including an analyzer adapted to determine a resonance frequency of the magnetic material or a width of a resonance curve of the magnetic material.

45. A method of determining a change in a spacing between first and second joined parts forming a joint, comprising:
associating an integrated gap sensor comprising a cantilevered oscillator with the joint; and
using the integrated gap sensor to determine the change in the spacing.

46. The method of item 45, wherein the gap sensor comprises a magnetic material attached to the cantilever, and the method further includes the step of determining a resonance frequency of the magnetic material or a width of a resonance curve of the magnetic material to determine a change in the spacing.

47. The method of item 46 or item 46, further including the step of positioning the integrated gap sensor at least partially between the first and second parts.

48. The method of any of items 45-47, further including the step of mounting the integrated sensor in a cantilevered fashion between the first and second parts.

49. The method of any of items 45-48, further including the step of forming the integrated gap sensor by mounting an oscillator to the first part, and mounting a sensor to the second part adjacent to the integrated gap sensor.

50. A sensor system for sensing a spacing between joined parts, comprising:
   a cantilevered oscillator associated with the joined parts;
   an electric coil for generating a magnetic field for causing the cantilevered oscillator to output a signal representative of a dynamic mechanical response of the cantilevered oscillator; and
   a sensor for sensing the signal.

Although the invention has been described in conjunction with specific embodiments, many alternatives, modifications, and variations will be apparent to those skilled in the art. Accordingly, it embraces all such alternatives, modifications, and variations that fall within the appended claims' spirit and scope. It is to be fully understood that certain aspects, characteristics, and features, of the invention, which are, for clarity, illustratively described and presented in the context or format of a plurality of separate embodiments, may also be illustratively described and presented in any suitable combination or sub-combination in the context or format of a single embodiment. Conversely, various aspects, characteristics, and features, of the invention which are illustratively described and presented in combination or sub-combination in the context or format of a single embodiment may also be illustratively described and presented in the context or format of a plurality of separate embodiments.

All publications, patents and patent applications mentioned in this specification are herein incorporated in their entirety by reference into the specification, to the same extent as if each individual publication, patent or patent application was specifically and individually indicated to be incorporated herein by reference. In addition, the identification of any reference in this application shall not be construed as an admission that such reference is available as prior art to the present disclosure.

As used herein, the following terms have the following meanings:

"A", "an", and "the" as used herein refers to both singular and plural referents unless the context clearly dictates otherwise. By way of example, "a compartment" refers to one or more than one compartment.

"About," "substantially," or "approximately," as used herein referring to a measurable value, such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The foregoing description has been presented for purposes of illustration. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for sensing a condition of a joint, comprising:
   a first flange;
   a second flange;
   at least one bolt connecting the first flange to the second flange;
   a gasket located between the first flange and the second flange; and
   a sensor integrated into the first flange, the second flange, or the at least one bolt, the sensor adapted to determine a change in a spacing of a gap between the first flange and the second flange;
   wherein the sensor comprises a flexible substrate forming a cantilevered oscillator including a plurality of spacers adapted to induce a curvature in the flexible substrate resulting from compression created by the first flange and the second flange, wherein the curvature results in a change in a resonance frequency of the cantilevered oscillator.

2. The apparatus of claim 1 wherein the sensor comprises a first component in contact with the first flange and a second component in contact with the second flange.

3. The apparatus of claim 1, wherein the sensor is adapted to connect to the first flange, the second flange, or the at least one bolt.

4. The apparatus of claim 1, wherein the sensor is at least partially between the first flange and the second flange.

5. The apparatus of claim 1, wherein the sensor comprises a holder positioned at least partially between the first flange and the second flange.

6. The apparatus of claim 5, wherein the holder includes a magnet forming a magnetic coupling with the first flange, the second flange, or the at least one bolt.

7. The apparatus of claim 5, wherein the holder includes a seat for seating a first component of the sensor.

8. The apparatus of claim 7, wherein the seat is connected to the holder by a connector.

9. The apparatus of claim 7, wherein the seat includes a spacer for positioning the first component adjacent to the first flange or the second flange.

10. The apparatus of claim 1, wherein the sensor comprises an interrogator for measuring the resonance frequency of a magnetic material supported in a cantilevered fashion from a periphery of the first flange or the second flange and forming the cantilevered oscillator.

11. The apparatus of claim 10, wherein the interrogator comprises at least one electric coil for generating an AC magnetic field to excite an oscillating motion of the magnetic material and detecting a signal representing an amplitude and frequency thereof.

12. The apparatus of claim 1, further including a plurality of sensors including the sensor integrated into the first flange, the second flange, or a plurality of bolts including the at least one bolt, the plurality of sensors adapted to determine a change in the spacing of the gap at a plurality of locations, whereby a variability of the gap across the first flange and second flange may be determined.

13. An apparatus for sensing a condition of a joint formed by a first flange and a second flange having a gap therebetween, at least one bolt connecting the first flange to the second flange, and a gasket located between the first flange and the second flange, comprising:
- a sensor adapted to be integrated into the first flange, the second flange, or the at least one bolt, the sensor adapted to determine a change in a spacing of the gap;
- wherein the sensor comprises a flexible substrate forming a cantilevered oscillator including a plurality of spacers adapted to induce a curvature in the flexible substrate as a result of compression created by the first flange and the second flange, wherein the curvature results in a change in a resonance frequency of the cantilevered oscillator.

14. The apparatus of claim 13, wherein the sensor comprises a first component adapted to contact the first flange and a second component adapted to contact the second flange.

15. The apparatus of claim 13, wherein the sensor is adapted to connect to the first flange, the second flange, or the at least one bolt.

16. The apparatus of claim 13, wherein the sensor is adapted to attach to the at least one bolt.

17. The apparatus of claim 13, wherein the sensor is adapted to fit in the gap between the first flange and the second flange.

18. The apparatus of claim 13, wherein the sensor comprises a holder adapted to be positioned at least partially between the first flange and the second flange.

19. The apparatus of claim 18, wherein the holder includes a magnet for forming a magnetic coupling with the first flange, the second flange, or the at least one bolt.

20. The apparatus of claim 19, wherein the holder includes a seat for a sensor component, the seat being connected to the holder by a connector.

21. The apparatus of claim 19, wherein the holder includes a spacer for positioning a sensor component adjacent to the first flange or the second flange.

22. The apparatus of claim 13, wherein the sensor comprises an interrogator for measuring the resonance frequency of a magnetic material supported in a cantilevered fashion from a periphery of the first flange or the second flange and forming the cantilevered oscillator.

23. The apparatus of claim 22, wherein the interrogator comprises at least one electric coil for generating an AC magnetic field to excite an oscillating motion of the magnetic material and detecting a signal representing an amplitude and frequency thereof.

24. A method of determining a condition of a gasket between a first flange and a second flange connected by at least one bolt, comprising:
- measuring a change in a spacing of a gap between the first flange and the second flange using a sensor integrated into the first flange or the second flange; and
- based on the change in the spacing, estimating the retained load on the gasket;
- wherein the estimating step comprises using a ratio of a change in the spacing from an initial bolt elongation value as an estimate of the retained load.

25. The method of claim 24, further including the step of sending an alert when the estimate of the retained load is below a predetermined value.

* * * * *